United States Patent [19]

Hurley et al.

[11] Patent Number: 4,467,783
[45] Date of Patent: Aug. 28, 1984

[54] RADIANT/JET IMPINGEMENT GAS-FIRED COOKING KETTLE

[75] Inventors: James R. Hurley, Weymouth; Joseph R. Birkner, West Peabody, both of Mass.

[73] Assignee: Thermo Electron Corporation, Waltham, Mass.

[21] Appl. No.: 463,782

[22] Filed: Feb. 4, 1983

[51] Int. Cl.³ .............................................. A47J 27/06
[52] U.S. Cl. .................................. 126/378; 126/349; 165/DIG. 11; 431/350
[58] Field of Search ................. 126/33, 284, 345, 348, 126/349, 376, 377, 378, 379, 389, 390; 165/DIG. 11; 99/293; 122/234; 220/428; 431/350

[56] References Cited

U.S. PATENT DOCUMENTS

| | | | |
|---|---|---|---|
| 522,586 | 7/1894 | Cgscaden | 126/345 X |
| 798,498 | 8/1905 | Dickson | 126/378 X |
| 2,134,377 | 10/1938 | Rocic | 126/376 X |
| 2,411,006 | 11/1946 | Sharp | 126/378 |
| 2,595,527 | 5/1952 | Kells et al. | 126/376 X |
| 2,622,590 | 12/1952 | Corbet et al. | 126/345 X |
| 2,708,436 | 5/1955 | Foster | 126/378 |
| 4,108,242 | 8/1978 | Searight et al. | 165/164 |
| 4,145,604 | 3/1979 | Carlsson | 219/439 |
| 4,202,661 | 5/1980 | Lazaridis et al. | 432/8 |
| 4,343,292 | 8/1982 | Kells et al. | 126/378 |

FOREIGN PATENT DOCUMENTS 456164 11/1936 United Kingdom ............... 126/378

Primary Examiner—Margaret A. Focarino
Attorney, Agent, or Firm—Herbert E. Messenger

[57] ABSTRACT

Disclosed is a vapor-jacketed cooking kettle having a compact, self-contained, gas-fired combustion system. The tiltable kettle includes a gas-fired cylindrical power burner which fires radially into a combustion chamber below a jet plate which in turn is closely spaced below the bottom wall of a water-containing jacket. Hot combustion gases produced by the burner heat and jet plate to temperatures at which it radiates large amounts of heat to the jacket wall. The hot gases also pass through holes in the plate to form high velocity jets which impinge on the jacket wall and transfer heat by convection. Heat transferred by the jet impingement and radiation vaporizes water in the jacket and the resulting steam cooks food products in the kettle. Thermal efficiencies of 70 percent or higher are achieved by the tilting kettle system.

13 Claims, 6 Drawing Figures

RADIANT/JET IMPINGEMENT GAS-FIRED COOKING KETTLE

BACKGROUND OF THE INVENTION

This invention relates to vapor-jacketed vessels, particularly to a steam-jacketed cooking utensil having a highly efficient, self-contained, gas-fired combustion system.

Steam-jacketed kettles are used extensively in commercial and institutional kitchens. A major feature of such kettles is a cooking surface which can be maintained at or near a constant cooking temperature. The steam-jacketed kettles are available in a variety of sizes (from about 5 to 120 gallons) and are either stationary or may tilt to facilitate removal of food.

Typical steam-jacketed kettles are heated either electrically, as described for example in U.S. Pat. No. 4,145,604, or have separate gas-fired boilers. Other heating arrangements have been proposed, such as the fired-tube vapor generator or wickless heat pipe set forth in U.S. Pat. No. 4,343,292.

Self-contained, gas-fired steam-jacketed kettles are generally large, having a capacity of 40 to 120 gallons. Smaller (5 to 20 gallon) tabletop or wall-mounted kettles are available, but typically only as self-contained, electrically heated units or in a gas-fired "battery" configuration. The electrically-heated units have relatively low heating efficiency and slow response. The "battery" type, which employ a large gas-fired boiler to produce steam for a number of kettles, have the drawback that their boiler must generate steam even if only a single unit is in operation. Also, a breakdown of the boiler renders all of the kettles unusable.

Accordingly, it is an object of the invention to provide a vapor-jacketed cooking utensil having a self-contained heating system of high efficiency.

It is an object of the invention to provide a vapor-jacketed kettle with a compact, self-contained, gas-fired heating system.

It is also an object of the invention to provide a steam-jacketed kettle having a self-contained heating system which provides significant amounts of heat through both radiation and convection.

It is an object of the invention to provide a heating system for a steam-jacketed kettle which permits rapid heatup of the kettle.

It is a further object of the invention to provide a gas-fired heating system for a steam-jacketed kettle whose exhaust products contain low levels of $NO_x$ and $CO$.

SUMMARY OF THE INVENTION

The invention relates to a cooking utensil including a fluid-jacketed kettle for holding food products to be heated and a compact, self-contained, gas-fired combustion system for efficiently transferring heat to the jacket surrounding a lower portion of the kettle. A jet plate is closely spaced below the bottom wall of the jacket and, together with a combustion housing on which the plate is supported, defines a generally bowl-shaped combustion chamber. A gas-fired power burner supplied through a blower with a pressurized fuel gas/air mixture is arranged to fire into the combustion chamber, where a spark igniter or glow coil provides ignition. The resulting hot combustion products heat the jet plate to a specified temperature, such as 1500°–1600° F., at which the plate radiates significant amounts of heat to the jacket bottom wall. The jet plate also has many generally uniformly-spaced holes through which the hot combustion gases are forced, forming gas jets. Impingement of these high velocity jets on the jacket bottom wall transfers large amounts of heat to the wall by convection. An exhaust system then collects gases from the spent jets and removes them from the gap between the jacket and the jet plate.

According to a preferred embodiment of the invention, the kettle and jacket are tiltable relative to a fixed combustion system. In this tilting kettle the jet plate is preferably formed of stainless steel or other high temperature steel and has a concave upward, disk-like shape closely matching the shape of the bottom wall of the kettle jacket. A preferred burner is a cylindrical, ribbon-type power burner which fires radially into the combustion chamber and is controlled to maintain a specified fluid temperature in the kettle jacket as monitored by a temperature probe. The exhaust system of the kettle may be uncontained so that exhaust gases pass out of the gap between the jacket and jet plate at all circumferential positions, or it may comprise a sealed system which collects exhaust gases and directs them to a single exhaust duct.

DETAILED DESCRIPTION OF PREFERRED EMBODIMENTS OF THE INVENTION

Figure 1:
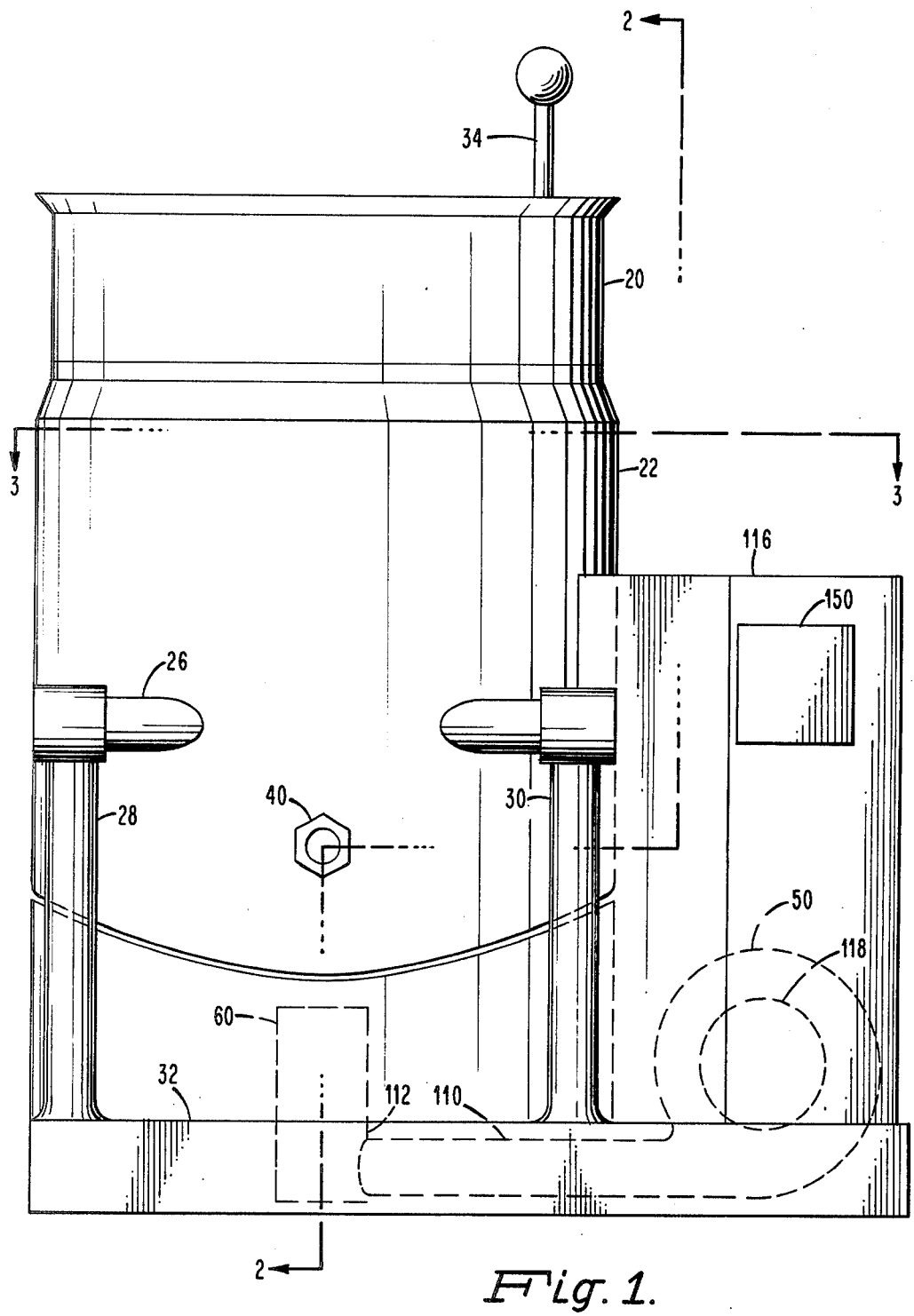
FIG. 1 is a front view of a preferred tilting kettle according to the invention.
Figure 2A:
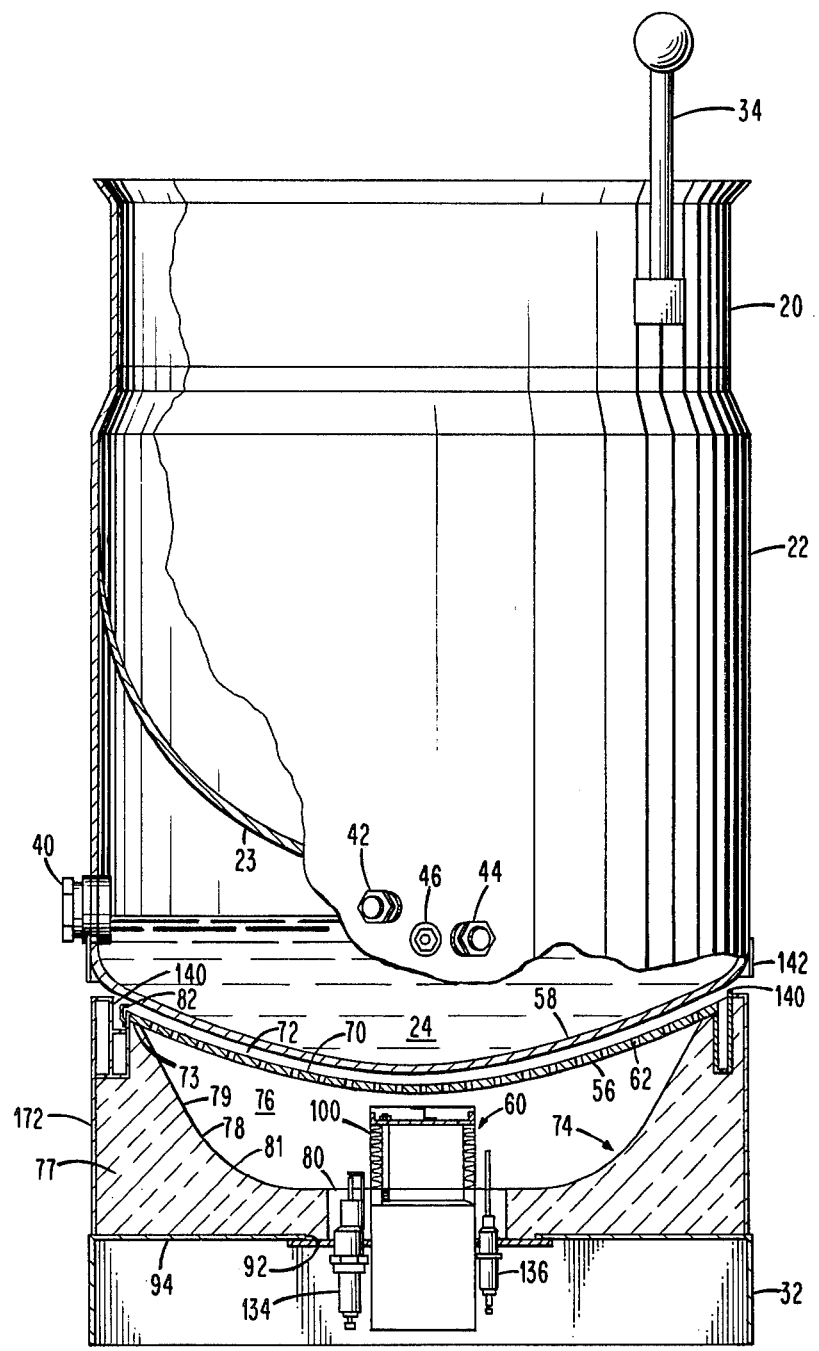
FIG. 2a is a side view of the tilting kettle of FIG. 1 taken along the line 2—2.
Figure 2B:
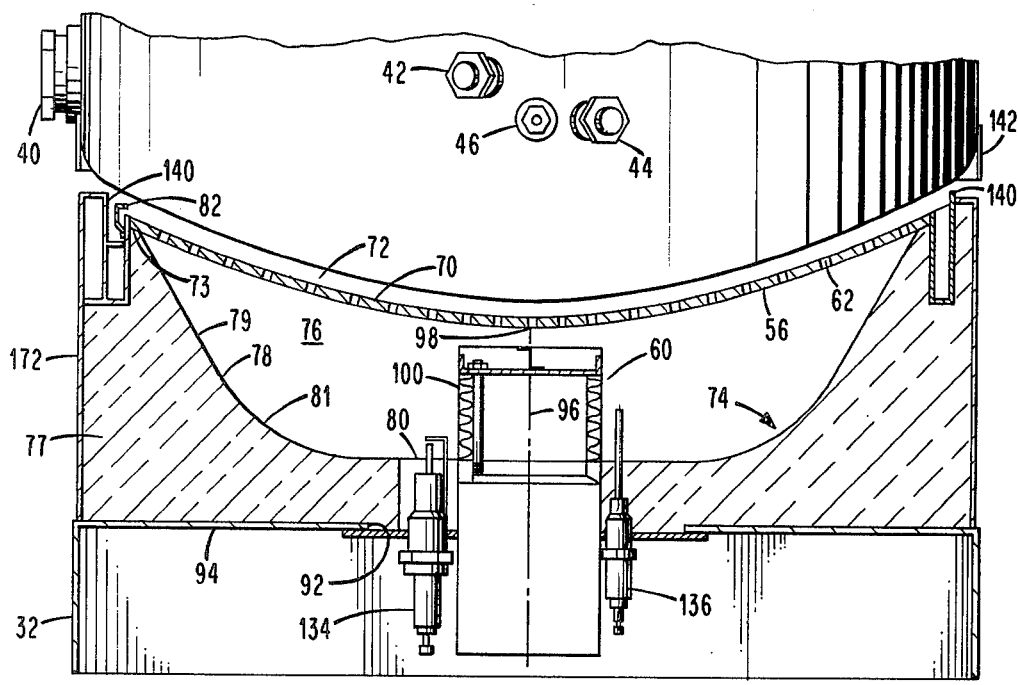
FIG. 2b is a partial side view of the tilting kettle of FIG. 2a shown at an enlarged scale to more clearly illustrate details of the kettle.
Figure 3:
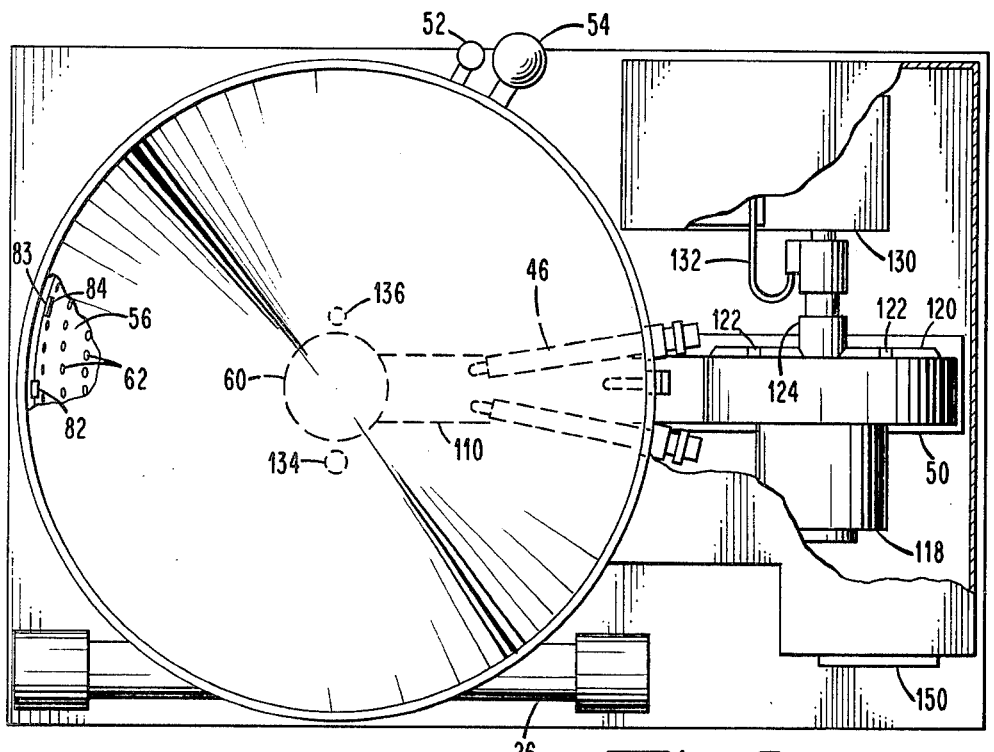
FIG. 3 is a top view, with portions broken away to show internal details, of a preferred tilting kettle according to the invention.

FIGS. 1–3 show a preferred gas-fired cooking utensil according to the invention including a kettle 20 for holding food products to be heated and a jacket 22 which encloses at least the lower portion of the kettle 20. The jacket 22 and the enclosed outer surface 23 of the kettle 20 together define a cavity 24 which is filled to a desired level with a vaporizable working fluid used to transfer heat to the kettle 20. Water is a preferred working fluid; however, the fluid may instead be any of various organic fluids which boil at suitable temperatures.

The gas-fired cooking utensils of this invention, hereinafter referred to as tilting kettles, may be fixed or may include a tilt mechanism which permits rotation of at least the kettle 20 and jacket 22 to facilitate emptying and cleaning of the kettle. As shown most clearly in the front view of FIG. 1, a suitable tilt mechanism includes a horizontal bar 26 extending through and attached to the front of the jacket 22. The ends of the bar 26 are pivotably supported by legs 28 and 30 which in turn are attached to a base 32. A handle 34 attached to the kettle 20 near its top may be used to rotate the kettle from an upright position as shown in FIG. 1 to a tilted position wherein the top of the kettle 20 is forward of its upright position. The rotation may be up to 90 degrees so that the kettle 20 assumes a horizontal position, or even a somewhat greater amount.

Another suitable tilting arrangement (not shown) includes a single pivot mounted on the right side of the kettle 20 (as viewed in FIG. 1). The support bar of this "side pivot" arrangement provides a convenient conduit for passage of electric wiring used in the control system of the kettle.

Various gauges are conventionally provided for monitoring and controlling conditions within the cavity 24. A sight gauge 40 permits visual monitoring of fluid level in the cavity 24. High level and low level indicators 42 and 44 warn of excessive or insufficient fluid in the cavity and may be used to automatically shut off the flow of fuel gas to the tilting kettle to prevent damage or to correct malfunctions. A temperature probe 46 extends through the jacket 22 to monitor temperature of the fluid within the cavity 24 and is electrically connected to a blower 50 in the lower portion of the tilting kettle for operational control of a combustion system to be described hereinafter. As shown in FIG. 3, a relief valve 52 and a fluid fill line 54 are included and communicate with the cavity 24 to respectively provide safety relief of excess pressure within the cavity 24 and to permit addition of fluid as needed.

An important aspect of the invention is the radiant/jet impingement system employed to transfer heat to the working fluid in the cavity 24 which in turn heats the kettle 20 and food products held by the kettle. Key elements of this self-contained gas-fired combustion system are a jet plate 56 mounted a prescribed distance below the bottom wall 58 of the jacket 22 and a power burner 60. The burner 60 produces a flow of high temperature combustion products and directs the products into contact with the jet plate 56 and through a multiplicity of holes 62 in the plate. The combustion products heat the jet plate 56 to radiance and also form high velocity jets which impinge on the bottom wall 58 of the jacket 22. Significant amounts of heat are thus transferred to the bottom wall 58 both by radiation from the plate 56 and by convection from the jets of hot gases.

To provide efficient heating, the jet plate 56 has an upper surface 70 whose shape conforms closely to that of the bottom wall 58. Thus, for the tilting kettle of FIGS. 1-3 the jet plate upper surface 70 is concave and approximately disk-shaped. Preferably the plate 56 is of uniform thickness and is formed from flat metal sheet stock. Any of various stainless or other heat resistant steels may be used, or the jet plate may be made from any other material which has adequate strength, crack and temperature resistance, and the capacity to absorb and radiate heat effectively. One suitable stainless steel is that designated Type Number 303 by the American Iron and Steel Institute. A suitable method of fabricating the plate is to cut a disk of the desired diameter from sheet stock, drill the required holes, and then form the plate to the appropriate curved shape by a spin process.

As is best shown in FIGS. 2a and 2b, the jet plate 56 is supported a prescribed distance or gap 72 below the bottom wall of the jacket 22 by an upper surface 73 of a combustion housing 74, and the jet plate 56 and housing 74 together define a combustion chamber 76. The housing is formed of or packed with high temperature insulation 77 such as fibrous ceramic material and has a generally concave surface 78 whose side and bottom wall portions 79 and 80 are joined by a curved transition section 81. The avoidance of sharp corners in the surface 78 promotes smooth flow of combustion gases and quiet burner operation.

Hold-down devices such as clips 82 are provided at various circumferential locations of the outer edge of the plate 56 to hold the plate against the housing surface 73 and prevent flow of gases out of the combustion chamber 76 along the surface 73. This ensures that essentially all of the combustion gases flow through the holes 62 of the jet plate 56, forming high velocity jets which strike the jacket bottom wall 58 and transfer heat thereto. To permit the plate to be positioned in a selected circumferential location, the housing surface 73 may have tabs or raised portions 83 (FIG. 3) which fit into indexing slots 84 cut from the plate 56.

Hot combustion gases for heating the jet plate 56 and forming high velocity gas jets are generated by a gas-fired power burner 60 mounted in an opening 92 in the bottom wall 94 of the combustion housing 74. Preferably the burner 60 is a cylindrical ribbon burner having an axis 96 aligned with the center 98 of the jet plate 56 and operable to fire radially into the combustion chamber 76 through a ribbon structure 100. The burner 60 may be formed of high temperature metal or ceramic, and one suitable ceramic burner is a cylindrical structure containing holes for radial firing.

The burner 60 is connected by means of a duct 110 extending through a burner side wall 112 to the blower 50, which directs a combustible mixture of fuel gas and air to the burner 60. As is shown in FIG. 1, the blower 50 is desirably enclosed within a housing or cabinet 116 aside of the jacket 22, and a motor 118 is mounted on one side of the blower 50 to drive an impeller therein. On the other side are provided means for delivering air and fuel gas to the blower 50 such as an air orifice plate 120 (see FIG. 3) having one or more openings 122 and a gas fuel nozzle 124 extending through a central opening of the plate 120. The gas nozzle 124 is connected to the outlet side of a gas regulator 130 which in turn receives fuel such as natural gas or propane through a gas supply line 132. For reasons of safety, the gas regulator 130 preferably includes a "zero governor" valve which permits gas to flow from supply line 132 to the gas nozzle 124 only when suction is applied by the blower 50 so that pressure within the nozzle 124 is less than atmospheric.

The fuel gas and air drawn into the blower 50 are directed out of its high pressure side and through the duct 110 to the burner 60. Considerable mixing of the fuel gas and air occurs in the blower 50 and duct 110 so that the fuel gas and air enter the burner 60 as a uniform combustible mixture. This mixture is thereafter directed through the ribbon structure 100 of the burner and ignited by an ignition device 134 mounted near the ribbon structure. The ignition device illustrated herein is a spark igniter; however, a glow coil or other suitable device may be utilized. A flame sensor 136 may also be provided adjacent to the burner 60 to verify proper ignition of the fuel/air mixture and, by operation of an appropriate control device (not shown) connected between the blower 114 and the flame sensor 136, to shut down the blower 50 and thus the flow of fuel gas in the event of an ignition failure.

Hot gases generated by combustion of the fuel gas/air mixture flow radially outward from the burner 60 into the combustion chamber 76 and are forced upward under pressure through the holes 62 in the jet plate 56. The hot gases heat the plate 56 to a temperature in the range of 1200°–1600° F. and preferably in the range of 1500°–1600° F. Also, the gases form jets which flow at high velocity across the gap 72 and impinge on the bottom wall 58 of the jacket 22. The impinging jets disrupt or prevent formation of boundary layers on the bottom wall 58 and provide highly efficient convective transfer of heat to the wall.

To increase its absorptivity, the bottom wall 58 of the jacket 22 is preferably coated with black paint or other suitable coating.

After impingement of the jets on the wall 58, exhaust from the spent jets is carried out of the gap 72 and away from the tilting kettle. In the preferred tilting kettle shown in FIGS. 1–3 no seal is provided between the combustion housing 74 and the jacket bottom wall 58 so that exhaust gases pass generally radially outwardly through the gap 72 and emerge between the jacket 22 and the combustion housing 74 around the entire 360-degree circumference of the tilting kettle. The absence of a seal between the bottom wall 58 and the combustion housing 74 permits a simple exhaust system in the tilting kettle and also permits ready access to the jet plate 56 for periodic cleaning and inspection of the plate.

Although the gap 72 is unsealed, a flow restrictor 140 may extend upward from the top of the combustion housing 74 radially outward of the jet plate 56 and across a portion of the gap to help contain the impinging jets and control the outflow of exhaust gases. A conventional hood (not shown) may also be mounted above the tilting kettle to collect the exhaust gases and vapors which escape from the kettle 20 and remove them from the room in which the tilting kettle is installed. If desired, a drip guard such as the ring-shaped guard 142 (FIG. 2a) may be attached to the lower side wall of the jacket 22 to help shield the jet plate 56 from spillage of food products from the kettle 20.

Althouqh it is possible in the combustion system of the tilting kettle described herein to utilize burners which have various turn-down ranges, the burner 60 is preferably an on/off (non-modulating) power burner. Operating control of the burner 90 is thermostatic—that is, the burner 60 is operated so as to maintain a desired temperature within the jacket 22 as measured by the temperature probe 46. To achieve such control, the probe 46 is connected by suitable wiring to the motor 118 of the blower 50, to the ignition device 134, and to a cooking level control 150 mounted on the front of the cabinet 116. The cooking level control 150 may, for example, include a movable indicator which can be set at any of several positions such as "warm," "brown," "simmer," and "boil."

Attainment of high thermal efficiencies (70% or greater), as have been demonstrated in the compact, self-contained gas-fired tilting kettle of the invention, requires careful selection of various components of its combustion system. As noted previously, the preferred radially-firing cylindrical power burner 60 of the invention provides compact, efficient combustion. Proper selection of the size and spacing of the holes 62 of the jet plate 56 and of the gap 72 between the plate and the jacket bottom wall 58 is important in achieving efficient heat transfer. A narrow gap, for example, promotes large amounts of radiant heat transfer from the plate 56 to the wall 58 and high jet impingement velocities. An excessively narrow gap, however, can interfere with removal of spent jets from the gap as exhaust, and inadequate hole-to-hole spacing in the plate 56 may result in interference between adjacent jets. A gap of about one-quarter inch has been found suitable when used with holes having a diameter of about one-tenth inch and an average hole-to-hole spacing of about six-tenths of an inch.

Figure 4:
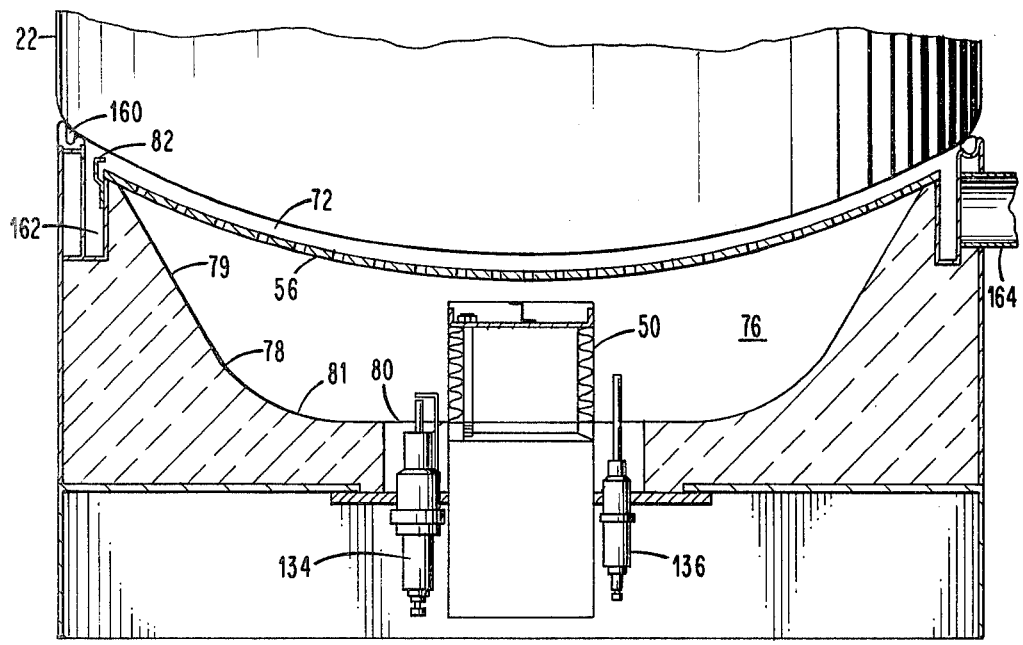
FIG. 4 is a partial side view of an alternate embodiment of the invention.

FIG. 4 is a partial side view of an alternate embodiment of the invention in which the combustion system of a gas-fired tilting kettle has a contained or sealed exhaust. A seal 160 is provided between the top of the combustion housing 74 and the bottom wall 58 of the jacket 22 at a position radially outward of the jet plate 56. The seal 160 is preferably a ring-shaped gasket attached to the combustion housing 74. To collect and vent the exhaust gases from the gap 72, the housing 74 includes an annular slot 162 at a radial position between the seal 160 and the jet plate 56, and the slot 162 communicates with an exhaust duct 164 which is preferably located at the rear of the combustion housing 74. This contained exhaust system protects the plate 56 from spills of food products while the kettle 20 and jacket 22 are in an upright position. It also shields users of the tilting kettle from exhaust gases, unlike the "open seal" embodiment illustrated in FIG. 2a which permits outflow of exhaust (although at safe, low velocities) from the entire 360-degree circumference of the kettle. However, the tilting kettle with contained exhaust system is likely somewhat less efficient than the "open seal" arrangement of FIG. 2a since the latter has lower pressure losses and thus potentially a higher convective heat transfer coefficient.

Figure 5:
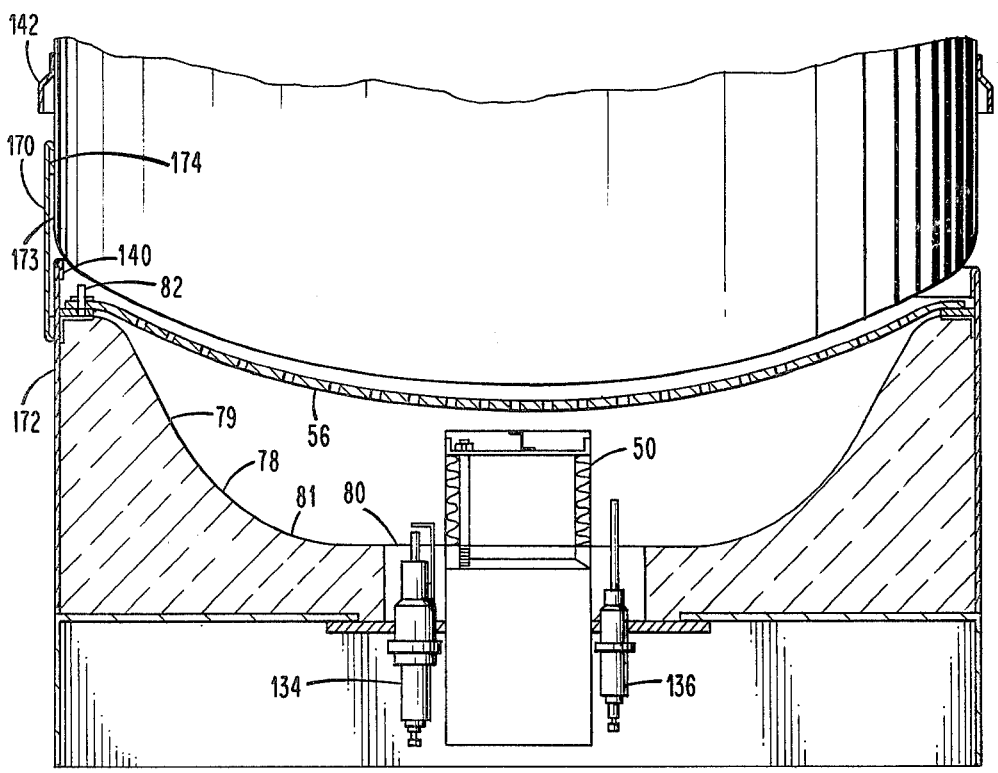
FIG. 5 is a partial side view of another alternate embodiment of the invention.

Another modified version of the tilting kettle is shown in FIG. 5 wherein the front (approximately 180-degree) portion of the tilting kettle includes a protective skirt 170 attached to an outer wall 172 or plate of the combustion housing 74 and extending upward along a lower portion of the jacket side wall 173. An upper edge 174 of the skirt 170 is in sealing contact with the side wall 173 when the kettle 20 and jacket 22 are in their upright position so that little or no exhaust gas escapes through the front (180-degree) portion of the gap 72. The rear half of the gap is open (similar to the tilting kettle illustrated in FIG. 2a) so that exhaust gases pass freely through the rear 180-degree portion of the tilting kettle.

A self-contained gas-fired tilting kettle of the present invention is applicable to kettles of varying capacities but is especially well-suited to small kettles such as those in the 5–10 gallon size. For a ten-gallon gas-fired tilting kettle, a typical jet plate 56 may have a diameter of about 14.4 inches and a thickness of about 0.2 inches and may contain about 250 holes of 0.1 inch diameter uniformly spaced over its surface. A suitable qas-fired burner for the ten-gallon tilting kettle is a ribbon-type, radially-firing cylindrical power burner delivering 30,000–60,000 BTU/hour and operable to heat the jet plate to between 1500° F. and 1600° F. Of the energy transferred to the kettle jacket by this combustion system when heating the jet plate to 1600° F., about 60 percent is delivered by impinging jets of hot combustion gases and the remaining forty percent is delivered by radiation from the jet plate.

In tests of a ten-gallon tilting kettle system constructed in accordance with the above-described parameters, this efficient, two-mode heat transfer system has consistently demonstrated thermal efficiencies in excess of 70 percent.

The gas-fired combustion system of the tilting kettle, in addition to providing high cooking efficiencies and a fast response, yields exhaust levels of nitrogen oxides and carbon monoxide which are well below acceptable maximums. The low levels of $NO_x$ and CO are due in part to the rapid and complete combustion in the power burner 60. Also important is the quick drop in temperature of the combustion products from levels at which $NO_x$ is generated to well below such levels as gases strike and then pass through the jet plate.

Although our invention has been shown and described with reference to particular embodiments, it should be apparent that certain modifications to these embodiments are within the scope of the invention. For example, the kettle apparatus may be fixed rather than tiltable. Also, if tiltable, various components or all of the combustion system may be attached to, and tilt with, the kettle and its jacket. The jet plate may be formed in shapes other than the concave upward configuration illustrated herein, for example, a convex upward plate and jacket bottom wall may be utilized, offering increased surface area and thus potentially higher efficiency. It is intended that these and other modifications be included within the scope of the appended claims.

What is claimed is:

1. In a cooking utensil including a kettle for holding products to be heated and a jacket enclosing at least a lower wall portion of said kettle, said jacket having a side wall and a bottom wall which together with said lower wall portion of said kettle form a cavity for retention of a vaporizable fluid, the combination therewith of a heat transfer system comprising:

a jet plate mounted below the bottom wall of said jacket and having a multiplicity of openings therethrough, the upper surface of said plate being substantially parallel to the bottom wall of said jacket to form a substantially uniform jet gap there between;

a combustion housing mounted below said jet plate and defining with said plate a combustion chamber, said housing including a side wall, a bottom wall facing said plate, and an upper wall portion sealably supporting said plate near the periphery thereof;

burner means for directing hot gases into said combustion chamber and against the lower surface of said plate to heat said plate to radiance and to produce jets of hot gases which flow at high velocity into said jet gap from said openings and impinge on said bottom wall; and exhaust means for removing said hot gases from said jet gap.

2. In a cooking utensil including a kettle for holding products to be heated and a jacket enclosing at least a lower wall portion of said kettle, said jacket having a side wall and a bottom wall which together with said lower wall portion of said kettle form a cavity for retention of a vaporizable fluid, the combination therewith of a heat transfer system comprising:

a jet plate mounted below the bottom wall of said jacket and having a multiplicity of openings therethrough, the upper surface of said plate being substantially parallel to the bottom wall of said jacket to form a substantially uniform jet gap therebetween;

burner means for directing hot gases against the lower surface of said plate to heat said plate to radiance and to produce jets of hot gases which flow at high velocity into said jet gap from said openings and impinge on said bottom wall, said burner means comprising a combustion housing mounted below said jet plate and defining with said plate a combustion chamber, said housing having an opening therein and including a side wall and also including a bottom wall facing said plate, a gas-fired power burner mounted within the opening of said combustion housing, said burner adapted to fire into said combustion chamber and means for delivering a combustible mixture of fuel gas and air to said burner; and exhaust means for removing said hot gases from said jet gap.

3. A cooking utensil according to claim 2 wherein said jet plate is sealably supported by an upper wall portion of said combustion housing.

4. A cooking utensil as in claim 2 wherein said power burner is a ribbon burner operable to heat said jet plate to a temperature of from about 1500° F. to 1600° F.

5. A cooking utensil as in claim 2 wherein said burner is a cylindrical ribbon burner having a generally vertically-oriented axis, said burner being mounted to fire radially into said combustion chamber.

6. A cooking utensil as in claim 2 wherein said jet plate is substantially disk-shaped with its center aligned with an axis of said burner.

7. A cooking utensil as in claim 6 including a gas-tight, annular seal between the top of said combustion housing and a portion of the bottom wall of said jacket radially outward of said jet plate.

8. A cooking utensil as in claim 7 wherein said combustion housing has an annular slot therein between said seal and the outer edge of said jet plate for collecting gases from said jet gap, and said vessel includes an exhaust duct extending through the side wall of said combustion housing into said slot for removing exhaust gases from said heat transfer means.

9. A cooking utensil as in claim 6 including an exhaust restrictor attached to said combustion housing radially outward of said jet plate and extending across a portion of the exhaust gap formed between the top of said housing and the bottom wall of said jacket to thereby form a restricted passage permitting the flow of exhaust gases out of said utensil.

10. A cooking utensil as in claim 9 including means for tilting said kettle and jacket forward about a substantially horizontal axis from an upright position to a tilted position wherein the top of said kettle is forward of its upright position.

11. A cooking utensil as in claim 10 including a protective skirt attached to said combustion housing, said skirt extending upwardly and circumferentially to cover both said exhaust gap and a lower portion of the side wall of said jacket over a forward portion of said utensil.

12. A cooking utensil as in claim 2 wherein said means for delivering a pressurized, combustible mixture of fuel gas and air to said burner comprises:

a source of fuel gas;

a blower;

gas regulator means for permitting the flow of fuel gas from said source to said blower only upon the presence of a partial vacuum on the downstream side of said regulator means;

an orifice plate attached to said blower and having at least a first opening for admitting air to said blower and a second opening in communication with said gas regulator means; and a duct extending between said burner and the outlet of said blower.

13. A cooking utensil as in claim 11 wherein said protective skirt extends circumferentially over the front 180-degree portion of said jacket and exhaust gap to substantially seal said 180-degree portion of the exhaust gap while said kettle and jacket are in their upright positions and to permit forward tilting of said kettle and jacket.

* * * * *